United States Patent [19]

Musil et al.

[11] Patent Number: 4,796,877

[45] Date of Patent: Jan. 10, 1989

[54] WORKPIECE HOLDER AND SAW GUIDE DEVICE

[75] Inventors: James C. Musil, Hudson; Emery J. Zahuranec, Novelty, both of Ohio

[73] Assignee: Crawford Fitting Company, Solon, Ohio

[21] Appl. No.: 164,535

[22] Filed: Mar. 7, 1988

[51] Int. Cl.[4] ............................................... B25B 1/10
[52] U.S. Cl. ................................. 269/87.2; 269/157; 269/239; 269/902
[58] Field of Search ............... 269/99, 239, 246, 87, 269/87.1, 87.2, 288, 902, 157

[56] References Cited

U.S. PATENT DOCUMENTS

| | | |
|---|---|---|
| 149,736 | 4/1874 | Forker . |
| 286,426 | 10/1883 | Gray ........................... 269/239 |
| 682,785 | 9/1901 | Caldwell . |
| 1,505,205 | 8/1924 | Kilgau ......................... 269/239 |
| 1,609,953 | 12/1926 | Lee . |
| 1,842,573 | 1/1932 | Van Treek . |
| 1,845,438 | 5/1930 | Parkhurst .................... 269/902 |
| 1,919,353 | 7/1933 | Amor . |
| 2,024,112 | 12/1935 | Phillis ......................... 269/87.2 |
| 2,164,455 | 7/1939 | Hart . |
| 2,227,844 | 1/1941 | Roche . |
| 2,759,385 | 8/1956 | Franck . |
| 3,284,895 | 11/1966 | Selander et al. . |
| 3,504,906 | 4/1970 | Hart ............................ 269/239 |
| 4,723,771 | 2/1988 | Perret-Gentil ............... 269/902 |

FOREIGN PATENT DOCUMENTS 1039147 10/1953 France ............................ 269/239

Primary Examiner—Robert C. Watson
Attorney, Agent, or Firm—Fay, Sharpe, Beall, Fagan, Minnich & McKee

[57] ABSTRACT

A holder and saw guide device for an elongated tube or rod type workpiece includes V-shaped support areas accommodating various size workpieces in a first cavity. A gripping member extends into the first cavity for positioning in a gripping relation with the workpiece along a first concave surface of the gripping member. A second concave surface disposed on an opposite face of the gripping member presents a reversely-curved configuration. The second concave surface cooperates with a stem which is adapted for selective axial shifting movement. The gripping member is biased toward an open position facilitating installation and removal of the workpiece. A pair of parallel walls are disposed in generally normal relation to the longitudinal axis of the workpiece. These walls advantageously include hardened wear plates which line a guide structure for a cutting blade. A mounting member facilitates securing the device to an associated surface.

10 Claims, 2 Drawing Sheets

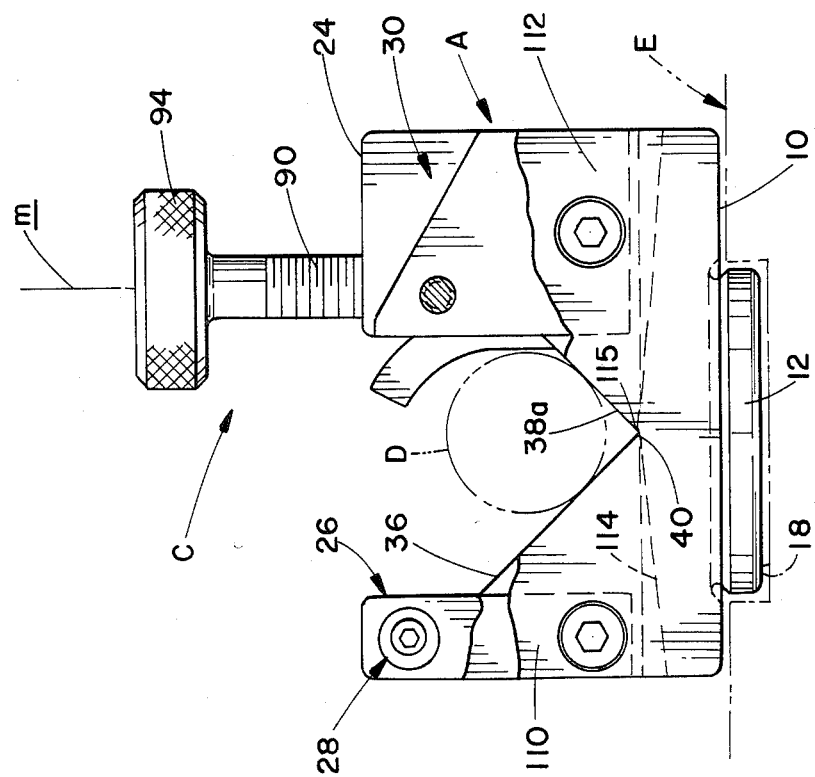
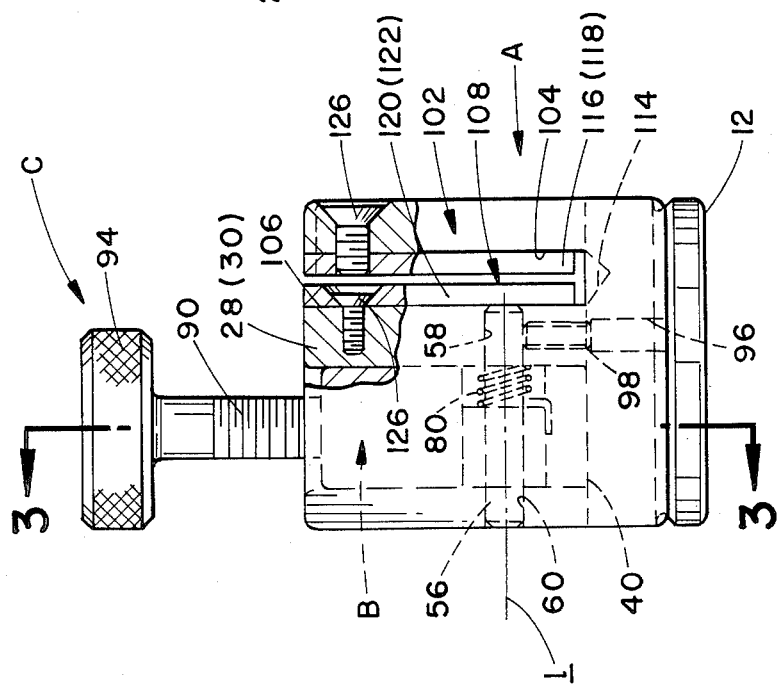

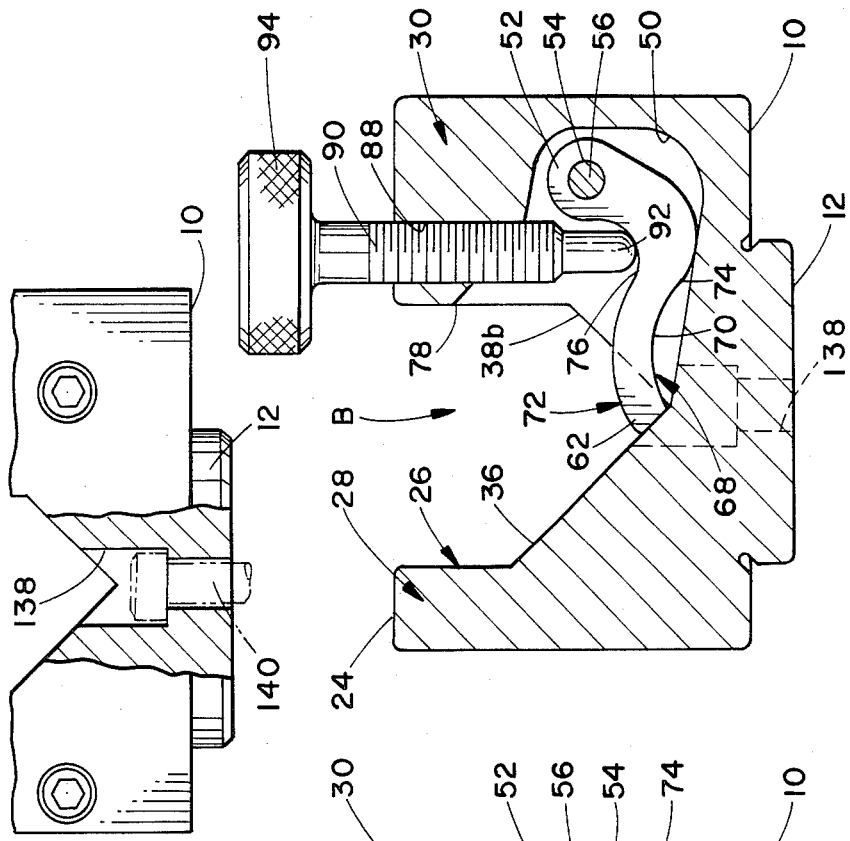
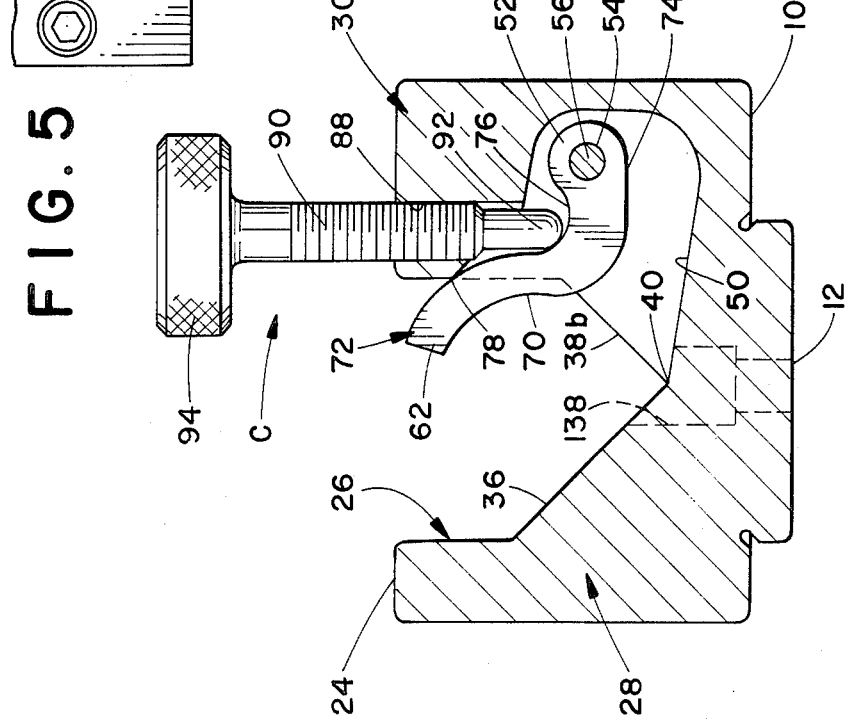

WORKPIECE HOLDER AND SAW GUIDE DEVICE

BACKGROUND OF THE INVENTION

This invention pertains to the art of clamping assemblies and more particularly to a vise-like arrangement. The invention is particularly applicable to a device for securely holding a tube or rod type of workpiece while accommodating workpiece cutting and will be described with particular reference thereto. However, it will be appreciated that the invention has broader applications and may be advantageously employed in other environments and adapted to other uses.

Prior art tube or workpiece cutting blocks were of simple, basic designs. Typically, a block included a plurality of apertures accommodating various workpiece sizes with a cross-slot adapted to guide a cutting blade. These prior art arrangements did not include clamping mechanisms usable with a wide variety of workpiece sizes. In fact, these prior arrangements could only hold workpieces for which there were appropriate sized holes formed in the block . An individual workpiece was fed into a predetermined aperture on one side of the block until the desired length was positioned outwardly of the cross-slot. This, in turn, presented problems when working with elongated workpiece tubes in confined areas. The actual cutting area also was not visible, resulting in workpiece surfaces and ends that were incorrectly and/or inaccurately cut. Moreover, no structure was included to securely hold the workpieces in place while they were being cut.

More recent developments in the field have employed clamping arrangements with a saw guide for the workpiece, but these devices also have been found lacking in one respect or another. It has, therefore, been considered desirable to design a cutting block that securely holds a workpiece. Additionally, the clamping mechanism should be adjustable to accommodate various workpiece sizes and should be easily maneuverable between workpiece release and clamping conditions. Further, such a device should be provided with a saw guide adjacent the clamping mechanism to facilitate cutting of the workpiece in a plane perpendicular to the longitudinal axis thereof. Preferably, the clamping device should be easily and securely mounted to various mounting surfaces.

The subject invention is deemed to meet the foregoing needs and others. In addition, the subject invention effectively overcomes many of the problems encountered with prior art clamping devices.

SUMMARY OF THE INVENTION

In accordance with the subject invention, a holding device for an elongated workpiece includes a body having a mounting lug extending outwardly from a base portion. A first cavity is formed in the body and includes generally V-shaped support areas for accommodating various workpiece sizes. A gripping or clamping member is pivotally mounted at one end in the cavity. The gripping member has a reversely curved conformation with first and second concave portions disposed on opposite sides thereof. The first concave portion is adapted to grippingly engage an associated workpiece placed in the cavity. The second concave portion is cooperable with an adjustment stem for permitting an adjustable clamping force to be applied to the workpiece through the gripping member. Means for biasing the gripping member in a direction opposed to the direction of the clamping force provided by the stem is also provided. Means for guiding an associated saw blade relative to the workpiece retained by the holding device is spaced from the first cavity.

In accordance with another aspect of the invention, a pair of wear plates are disposed on facing walls which define the guide means.

In accordance with a still further aspect of the invention, one end of the adjustment stem is provided with a knob-like actuating handle. Preferably, the adjustment stem is threadedly associated with the body of the holding device.

A principal advantage of the present invention is the provision of apparatus for securely clamping an associated workpiece for subsequent cutting.

Another advantage of the invention is the provision of such apparatus which includes guide means for accommodating precise cutting of the workpiece.

A further advantage of the invention is found in a clamping arrangement that accommodates various workpiece sizes.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a front elevational view of the subject new device wherein selected portions have been cut away for ease of illustration;

FIG. 2 is a side elevational view of the device taken from the left-hand side of FIG. 1;

FIG. 3 is a cross-sectional view along lines 3—3 of FIG. 2 illustrating the gripping member in a release position;

FIG. 4 is a cross-sectional view similar to FIG. 3 illustrating the gripping assembly in a completely closed position; and, FIG. 5 is a front elevational view with selected portions in cross-section of a structural arrangement adapted to facilitate mounting of the holding device.

DETAILED DESCRIPTION OF THE PREFERRED EMBODIMENT

Referring now to the drawings wherein the showings are for purposes of illustrating the preferred embodiment of the invention only and not for purposes of limiting same, the FIGURES show a workpiece holding and saw guide device comprised of a main clamping body A, a gripping assembly B, and a threaded adjustment stem C. An elongated workpiece D, and a planar base or mounting surface E are shown in phantom to better facilitate an appreciation of the invention. While workpiece D is shown as comprising an elongated tubular member, it is to be appreciated that the invention is equally applicable to use with other types of hollow and solid workpieces having a variety of cross-sectional conformations.

With particular reference to FIG. 1, the main clamping body includes a first or lower planar surface 10 that includes a mounting flange or lug 12 protruding outwardly therefrom. The mounting lug extends longitudinally of the device and is adapted for cooperative retaining engagement with the mounting surface E. Lug 12 is closely retained in a recess 18 formed in the mounting surface. As more clearly represented in FIG. 2, the lug 12 extends completely along the lower surface 10 so that the clamping body may be selectively mounted in transverse positions with respect to the recess 18.

A second or upper surface 24 is oppositely disposed from the lower surface 10 and has a first cavity 26 extending thereinto for defining a tube receiving area. As best shown in FIGS. 2 and 3, the cavity 26 is defined by a pair of sidewalls 28, 30. The sidewalls are generally parallel to a longitudinal axis of the clamping body, which extends through cavity 26 generally coextensive with the axis of an associated workpiece situated therein, as will become more apparent hereinbelow.

The first cavity 26 is further defined by tapered surfaces 36, 38 extending inwardly toward each other from the spaced apart sidewalls. These tapered surfaces are adapted to receive an associated workpiece D in a manner and for purposes to be described. The tapered surface 36 extends continuously across the lower portion of the first sidewall 28 while the second tapered surface 38 is comprised of two axially spaced portions 38a, 38b. The tapered surfaces 36, 38 intersect along apex 40 to thus form a V-shaped cavity portion. Typically, the tapered surfaces are arranged at an included angle approximating 90°; although other angular relationships are usable within the spirit and scope of the invention.

The first cavity 26 includes a contiguous cavity extension 50 of irregular conformation. As shown in FIGS. 3 and 4, the cavity extension 50 is formed between axially spaced portions 38a, 38b of the second tapered surface and extends into the base of sidewall 30. A gripping member B is mounted in the contiguous cavity for selective rotational movement. More specifically, the gripping member B has a generally arcuate first end 52 which includes a mounting aperture 54 extending transversely therethrough. A pin member 56 is received through aperture 54 in cooperation with apertures 58, 60 (FIG. 2) formed in the second sidewall 30. This arrangement facilitates rotation of the gripping member B about a pin member longitudinal axis 1. To achieve the desired clamping effect with a workpiece in a manner to be described, axis 1 extends substantially parallel with apex 40.

The gripping member B is of a somewhat serpentine conformation having a second end 62 adapted for gripping engagement with an associated workpiece D. A first or lower surface 68 includes a concave portion 70 adjacent the second end, and this concave portion is designed for abutting, gripping engagement of the workpiece. The concave portion 70 presents a smooth, curvilinear area that is adapted for mating relationship with a wide array of workpieces of varying sizes as will become more apparent hereinbelow. A second or upper surface 72 includes a concave portion 76 in generally opposed relation to first concave portion 70 so that the a reversely curved gripping member is thus defined. The second concave portion is disposed approximately mid-span between the first and second ends of the gripping member, and the gripping member is cooperable with a stop surface 78 formed on an upper wall portion of contiguous cavity 50.

With particular reference to FIG. 2, means for biasing 80 the grippng member in a clockwise direction as viewed in FIGS. 1, 3, and 4 is advantageously provided. The biasing means 80 comprises a helical spring in the preferred embodiment, and is disposed in close surrounding relation with the pin member 56. The spring is adapted to exert a first torsional force on the gripping member B continuously urging the gripping member toward a fully opened position in contact with stop surface 78.

Referring again to FIGS. 1, 3, and 4, a threaded aperture 88 in the main clamping body A receives an externally threaded adjustment stem 90. Rotation of the stem 90 produces relative movement with the main clamping body along a stem longitudinal axis m. A stem lower end 92 has an outermost curvilinear surface adapted for cooperative engagement with the upper surface 72 of the gripping member. Contact between the lower curvilinear surface 92 and the concave portion 76 of the upper surface ensures smooth abutting engagement therebetween in all positions of the gripping member. A knurled handle 94 is provided at the other end of the stem 90 to facilitate ease of manual rotation. Downward or inward movement of the stem into the body exerts a counterclockwise rotational force on the gripping member B as viewed in FIGS. 1, 3, and 4 which is opposed to and overcomes the force in the opposite direction generated by biasing means 80.

With particular reference to FIG. 2, an aperture 96 is formed through the lower surface 10 of the main body and receives a setscrew 98 therein. This setscrew acts to retain pin member 56 in place and inhibit any movement along its longitudinal axis 1.

With continued reference to FIG. 2 and, additionally, to FIG. 1, description will hereinafter be made to a saw guide means generally designated by numeral 102. This saw guide means is defined by front and rear walls 104, 106 disposed in spaced apart, facing relation with each other to define a second cavity 108 in the body. More particularly, the front wall 104 is defined by wall portions 110, 112 while the rear wall 106 is defined by the first and second sidewalls 28, 30. A bottom wall 114 extends between the front and rear walls 104, 106. As shown in FIG. 1, the bottom wall has a gently sloping taper from a central apex 115, positioned in substantially the same plane as apex 40. The apexes 40, 115 are disposed a predetermined distance "d" from the first surface 10. Due to the arrangement of apexes, 40, 115, from the first surface a cutting blade may cut completely through a supported workpiece D in a manner to be described.

A plurality of wear plates 116, 118, 120, 122 are disposed along the first and second walls 104, 106. These wear plates are formed of hardened steel and are secured to the walls through use of conventional fastening means 126 such as screws or the like for defining a narrowed cutting passage therebetween. The wear plates function to guide a hacksaw blade or the like through a narrow passage to achieve close guided cutting of an associated workpiece perpendicular to its longitudinal axis.

In operation, the clamping body A is mounted as shown in FIGS. 1 and 3, and the stem 90 is placed in an outer or retracted position with respect thereto so that gripping member B abuts the stop surface 78. The cavity 26 is thereby exposed to receive a workpiece for support along tapered surfaces 36, 38. The V-shaped relationship between surfaces 36, 38 assures that the longitudinal axis of the workpiece will be aligned over and extend parallel to apex 40. Such relationship also will orient the longitudinal axis of the workpiece in parallel spaced relation with pin axis 1.

Manual rotation of the adjustment stem C causes rotation of the gripping member about pin 56 against the opposite force of spring biasing means 80. The lower surface 68 of the gripping member, particularly the first concave portion 70, is caused to rotate into a clamping engagement with workpiece D. This first concave portion is adapted to engage workpieces having varying diameters in a manner so as to securely clamp a particular associated workpiece against the tapered surfaces 36, 38. A saw blade may thereafter be positioned into the guide means 102 against the workpiece for making a precise cut prependicular to the workpiece longitudinal axis. Once the cut is complete, rotation of handle 94 in the opposite direction will move the stem upwardly or outwardly of the clamping body. The biasing means 80, in turn, rotates the gripping member B upwardly and out of clamping engagement with the workpiece.

Referring now to FIG. 5, a mounting counterbore 138 extends downwardly from the V-shaped cavity portion through the first surface 10. A screw or similar fastener 140 is received in the counterbore to secure the clamping body to a mounting surface. Preferably, the counterbore is centrally positioned in the clamping body but use of plural counterbores and associated fasteners in various mounting configurations may be used without departing from the overall scope and spirit of the subject invention.

In this manner, the clamping body is adaptable to various mounting surfaces with a minimum of effort. Specialized recesses such as recess 18 need not be formed in all potential mounting surfaces. Instead, appropriate apertures are provided on a truck, trolley, etc. so that the clamping body is accommodated to various work environments. This versatile mounting arrangement also permits use of the clamping body A as merely a vise for fixedly holding a work member. Of course, it may still function as a saw guide device if required. The counterbore 138 minimizes installation labor of the clamping body to a secure mounting surface and essentially makes the device portable.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, what is claimed is:

1. A holding device for an elongated workpiece comprising:
    a body having a base portion including a mounting lug extending outwardly therefrom;
    a first cavity formed in said body opening opposite said base portion, said first cavity including V-shaped support areas adapted to supportingly receive a variety of workpiece sizes;
    a cavity extension portion contiguous with said first cavity and extending between said support areas;
    a gripping member having a first end pivotally mounted in said cavity extension portion and a second gripping end, said gripping member having a reverse curved configuration including first and second oppositely facing concave surfaces, said first concave surface disposed adjacent sid second end and adapted for abutting gripping engagement with an associated workpiece supported by said support areas;
    an adjustment stem threadedly mounted to said body in communication with said cavity extension for selective movement relative thereto, said stem including a first end having a smooth curvilinear surface in cooperative engagement with said second concave surface for exerting a first rotational force on said gripping member;
    biasing means exerting a second rotational force against said gripping means opposed to said first rotational force; and,
    means adapted for guiding a cutting blade relative to a workpiece retained in said body, said guide means having a second cavity spaced from said first cavity.

2. The tube holding device as defined in claim 1 further including a pair of parallel wear plates for lining said second cavity.

3. The tube holding device as defined in claim 1 wherein said first cavity is defined by first and second sidewalls, each of said first and second sidewalls having said support areas extending from base portions thereof.

4. The tube holding device of claim 1 wherein said first concave surface is disposed at one end of said gripping member, a pin cooperating with an aperture for pivotally mounting said gripping member at the other end, and said second concave surface defined therebetween.

5. The tube holding device of claim 4 wherein said biasing means includes a helical spring operatively engaging said pin member for exerting said first rotational force on said gripping member.

6. A workpiece holding device comprising:
    a body having a pair of opposed, parallel sidewalls, said sidewalls defining a first cavity having a first axis and adapted to receive a workpiece therealong for cutting, a pair of walls extending generally transverse to said first axis defining a second cavity adapted to receive an associated cutting tool therein, said first cavity including a pair of tapered surfaces adapted for supporting receiving a workpiece thereon;
    a gripping member disposed in said first cavity having first and second ends, said second end including an aperture adapted to receive a pin member for pivotally mounting said gripping member about a pivot axis offset from and parallel to said first axis and with said first end rotatable about said pivot axis, a first concave surface disposed between said first end and said pin member adapted for operative gripping engagement with a workpiece supported by said tapered surfaces, and a second concave surface disposed between said first concave surface and said pin member;
    an adjustment stem threadedly received by said body for selective movement along a second axis disposed normal to and between said first axis and said pivot axis, said adjustment stem having a curvilinear end in abutting engagement with said gripping member second concave surface so that selective advancement of said stem causes rotational movement of said gripping member whereby siad first concave surface is moved into clamping relation with a workpiece supported by said tapered surfaces;
    a spring disposed in said first cavity in operative relation with said gripping member for continuously urging said gripping member into abutting relation with said stem at said second concave surface;

means adapted for guiding a cutting blade relative to a workpiece retained in said body, said guide means including a second cavity spaced from said first cavity; and, a pair of wear plates lining opposed sides of said second cavity.

7. The tube holding device as defined in claim 6 wherein said stem includes a second end adapted for manual rotation.

8. A workpiece holding device comprising:

a base member having an outwardly extending lug;

a first cavity opening inwardly into said base member at an area oppositely disposed from said mounting lug, said first cavity including a V-shaped support surface adapted to receive an associated workpiece;

a cavity extension portion contiguous with said first cavity;

a clamping member pivotally mounted in said cavity extension portion, a first end extending into said first cavity, an aperture at a second end of said clamping member receiving a pin therein for pivotally mounting said clamping member; said clamping member being of reverse curved configuration, a first concave surface adjacent said first end adapted for engaging relation with the associated workpiece, a second concave surface on a face oppositely disposed from said first concave surface at approximately mid-span of said clamping member.

an aperture extending through said base member adapted to operatively receive an adjustment stem therethrough;

said adjustment stem having a smooth curvilinear first end adapted for engaging relationship with said clamping member second concave surface whereby rotation of said adjustment selectively reciprocates said stem with respect to said base member; and, means for biasing said clamping member into abutting engagement with said stem whereby the associated workpiece is positively released.

9. The workpiece holding device as defined in claim 8 further comprising a second cavity axially spaced from said first cavity, said second cavity adapted to receive an associated cutting blade.

10. The workpiece holding device as defined in claim 9 wherein said second cavity includes first and second wear plates on opposed facing walls of said second cavity.

* * * * *